US010891794B2

(12) United States Patent
Addoum et al.

(10) Patent No.: US 10,891,794 B2
(45) Date of Patent: Jan. 12, 2021

(54) METHOD AND SYSTEM FOR GENERATING AUGMENTED REALITY CONTENT ON THE FLY ON A USER DEVICE

(71) Applicant: BEAR, Montpellier (FR)

(72) Inventors: Pierre Addoum, Baillagrues (FR); Sylvain Guary, Montpellier (FR); Evgenii Khrushchev, Montpellier (FR); Evgeniy Dombrovskiy, Pokrovskoe (RU)

(73) Assignee: ARGO, Montpellier (FR)

( * ) Notice: Subject to any disclaimer, the term of this patent is extended or adjusted under 35 U.S.C. 154(b) by 0 days.

(21) Appl. No.: 16/392,294

(22) Filed: Apr. 23, 2019

(65) Prior Publication Data
US 2019/0340823 A1 Nov. 7, 2019

(30) Foreign Application Priority Data
May 2, 2018 (FR) ...................... 18 53781

(51) Int. Cl.
*G06T 19/00* (2011.01)
*G06K 9/00* (2006.01)
*G06F 3/0482* (2013.01)

(52) U.S. Cl.
CPC .......... *G06T 19/006* (2013.01); *G06F 3/0482* (2013.01); *G06K 9/00671* (2013.01)

(58) Field of Classification Search
None
See application file for complete search history.

(56) References Cited

U.S. PATENT DOCUMENTS

| | | | | |
|---|---|---|---|---|
| 10,497,180 B1* | 12/2019 | Perfilev | ................ | G06T 19/006 |
| 2006/0165377 A1 | 7/2006 | von Wendt | | |
| 2010/0091036 A1* | 4/2010 | Wright | ................ | H04N 5/2226 |
| | | | | 345/633 |
| 2010/0182340 A1* | 7/2010 | Bachelder | ............. | G09G 3/003 |
| | | | | 345/633 |
| 2012/0113223 A1* | 5/2012 | Hilliges | ................ | G06F 3/011 |
| | | | | 348/46 |
| 2014/0125668 A1* | 5/2014 | Steed | ..................... | G06T 15/50 |
| | | | | 345/426 |
| 2015/0049081 A1* | 2/2015 | Coffey | ................ | G06K 9/4604 |
| | | | | 345/419 |
| 2015/0215581 A1* | 7/2015 | Barzuza | ............. | G06F 3/04842 |
| | | | | 348/14.1 |

(Continued)

OTHER PUBLICATIONS

French Search Report from French Patent Application No. 1853781, dated Nov. 22, 2018.

*Primary Examiner* — David H Chu
(74) *Attorney, Agent, or Firm* — Greer, Burns & Crain, Ltd.

(57) ABSTRACT

A method for generating augmented reality content on the fly including the following steps:
  reading of a real image by the user device;
  identifying a scenario associated beforehand with the real image;
  producing augmented reality content, on the user device, by executing the scenario on the real image; and
  reading of the content by the mobile user device;
the production step including deleting, in the entire video, the pixels of a predetermined colour provided as display parameter, in the scenario. A system implementing such a method is also provided.

13 Claims, 2 Drawing Sheets

(56) References Cited

U.S. PATENT DOCUMENTS

| | | | |
|---|---|---|---|
| 2015/0316985 A1* | 11/2015 | Levesque | G06F 3/016 345/156 |
| 2016/0044294 A1* | 2/2016 | Friedman | H04N 9/75 348/587 |
| 2016/0148433 A1* | 5/2016 | Petrovskaya | G02B 27/01 345/633 |
| 2016/0189426 A1* | 6/2016 | Thomas | G06T 19/006 345/633 |
| 2016/0196692 A1* | 7/2016 | Kjallstrom | G06F 3/04815 345/633 |
| 2017/0063640 A1* | 3/2017 | Laughlin | H04L 43/045 |
| 2017/0132267 A1* | 5/2017 | Zhou | G06F 16/9537 |
| 2017/0205892 A1* | 7/2017 | Petrovskaya | G02B 27/0101 |
| 2018/0095618 A1* | 4/2018 | Valdivia | H04N 7/157 |
| 2018/0124370 A1* | 5/2018 | Bejot | G11B 27/036 |
| 2018/0124497 A1* | 5/2018 | Boesen | H04R 1/1091 |
| 2018/0157321 A1* | 6/2018 | Liu | H04L 51/00 |
| 2019/0253667 A1* | 8/2019 | Valli | H04S 7/303 |

* cited by examiner

METHOD AND SYSTEM FOR GENERATING AUGMENTED REALITY CONTENT ON THE FLY ON A USER DEVICE

BACKGROUND

The present invention relates to a method for generating augmented reality content on the fly on a user device, in particular of the smartphone, tablet or phablet type. It also relates to a system configured in order to implement such a method.

The field of the invention is, non-limitatively, that of generating augmented reality content on the fly on a mobile user device.

Augmented reality can be defined as being the superimposition of at least one virtual object onto a real image, or a sequence of real images, located in the environment of a user. The virtual object is inlaid into the real image by digital processing. The virtual object can be an image, a video, etc. The techniques of augmented reality are well known and widely used today in order to generate augmented reality video content, for example in real time.

Generating augmented reality content is carried out by digital computing, in order to process the virtual objects and to inlay them into the real image. This digital processing can be complex and require significant digital computing resources. For this reason, in most cases, generating augmented reality content is carried out at a central site, then distributed to one or more users.

However, this centralization is not flexible for generating augmented reality content on the fly. In addition, in order to be capable of providing augmented reality content to users on the fly, it is necessary for said content to be generated and stored at the central site beforehand, which requires storage resources which may be large, depending on the quantity of content to be stored.

An aim of the present invention is to overcome the aforementioned drawbacks.

Another aim of the present invention is to propose a method for generating augmented reality content on the fly that is simpler and more flexible.

Another aim of the present invention is to propose a method for generating augmented reality content on the fly with improved use of the available digital resources.

SUMMARY

At least one of these aims is achieved with a method for generating augmented reality content on the fly on a mobile user device, said method comprising the following steps:
during a phase, called preliminary phase, carried out for at least one image, called real image:
  configuring a scenario comprising at least one video and at least one display parameter, and
  associating said scenario with said real image;
during a phase called execution phase:
  reading of a real image by said user device,
  identifying a scenario associated beforehand with said real image,
  producing augmented reality content on said user device, by executing said scenario over said real image, and
  reading of said content by said mobile user device;
the production step comprising deleting, in the entire video, pixels of a predetermined colour provided as display parameter, in said scenario.

Thus, the method according to the invention carries out the production of augmented reality content on the mobile user device. As a result, the augmented reality content is not produced at a central site. Thus, the method according to the invention is more flexible, as it allows adaptation to each user device, and to the environment of each user device.

In addition, with the method according to the invention, the augmented reality content is produced on the fly after reading of the real image by the user device. As a result, there is no need to produce the augmented reality content beforehand and to store this content at a central site remote from the user device.

Moreover, the processing of the video, and more generally of the virtual objects to be inlaid into the real image is carried out on the user device. Thus, the method according to the invention makes it possible to exploit the computing resources already present on each user device, and to avoid providing additional computing resources at a remote central site.

Furthermore, the method according to the invention provides for deletion of the pixels of one colour in the entire video, without undertaking complex analysis, such as detecting a background or detecting a contour. The colour to be deleted is determined beforehand and provided to the user device, which is simpler and requires fewer computing resources.

In the remainder of the application, by "object" or "virtual object" is mean any visual object, such as an image or a video, used in order to produce the augmented reality content by superimposition/inlay onto/into a real image, or a series of real images.

In particular, the augmented reality content is visual or audio-visual multimedia content.

At least one display parameter of a scenario can be common to several, or to all, the virtual objects of said scenario.

Alternatively, or in addition, at least one display parameter of a scenario can be individual to a virtual object of said scenario and apply to said virtual object only.

For at least one image, the scenario can also comprise at least another audible and/or visual object in addition to the video.

Thus, the scenario can comprise several images and/or videos which are executed simultaneously or in turn.

The features that will be described hereinafter, with reference to the video can be applied, individually or in combination, to each object of the scenario.

According to a particularly advantageous feature of the method according to the invention, the production step can be carried out progressively with the step of reading the content, in particular simultaneously.

In other words, the production step and the reading step overlap in time so that the step of reading the content starts before the end of the production step. Reading the content can start shortly after the start of the production step, without waiting for the entire content to be produced.

Thus, generating the augmented reality content is carried out in a more reactive manner, in real time.

In addition, it is possible to end the production step when the reading step is stopped, for example by the user. This makes it possible to avoid producing a part of the content which will not be read.

The method according to the invention can comprise loading the video, and more generally each virtual object constituting the scenario, after the step of reading the real image.

According to a first alternative, the video, and more generally each virtual object constituting the scenario, can be loaded into the user device prior to the production step.

In this case, the loading of each virtual object ends before the start of the production step.

According to an advantageous alternative, the video can be loaded into the user device as the production step progresses, and even more particularly simultaneously.

In other words, loading the video and the production step overlap in time so that the step of production of the content starts before the end of the step of loading the video.

Thus, generating the augmented reality content is carried out in a more reactive manner, in real time.

In addition, it is possible to end the loading step when the production step is stopped, for example by the user. This makes it possible to avoid loading a part of the content which will not be used.

According to an advantageous version of the method according to the invention, the steps of loading the video, producing the augmented reality content and reading said content can be carried out simultaneously.

In other words, these three steps can overlap in time so that the reading step starts although the steps of loading the video and production of the augmented reality content have not ended.

Thus, the method allows more rapid generation of the augmented reality content on the fly.

The step of deleting a colour in the video can be carried out pixel by pixel, for each image constituting the video.

In particular, the step of deleting a colour in the video can comprise replacing each pixel of said colour by a transparent pixel, in particular in each image constituting the video.

Such a replacement can be carried out by modifying the colour values for said pixel, or by deleting said pixel in each image constituting the video.

According to an embodiment, the configuration step can comprise, for at least one video forming part of a scenario, a manual step of selecting the colour to be deleted.

Such a selection can be carried out by the operator having designed the scenario and stored as a display parameter for said video or for the entire scenario.

The selection of the colour to be deleted can be made by manual selection of said colour:
  in the video, or
  from several predetermined selections.

This selection can be carried out for example by means of a pointer, of the computer mouse type, or a user's finger on a touch screen, in the video, respectively within the selections offered.

The selections offered can be preconfigured or determined by analysis of a background of the video.

Advantageously, a scenario can comprise at least one display parameter relating to the orientation of a display plane of at least one object of the scenario with respect to the display plane of the read image, provided to the user device during the execution phase and used during the production step for adjusting the orientation of said at least one object.

The orientation can be relative to the entire scenario, so that the entire scenario is executed in one and the same plane.

Alternatively, an orientation can be individual to at least one object forming the scenario, such as for example a video, an image, etc.

Preferentially, the display plane of at least one object, and in particular of the scenario, can be perpendicular to the plane formed by the image, so that the objects are perceived as resting vertically on said image.

This makes it possible to have a 3D rendering for the augmented reality content.

Of course, generally, a scenario can comprise at least one display parameter other than those already described, namely a colour to be deleted and an orientation.

For example, a scenario can also comprise any combination of at least one of the following display parameters:
  a display position,
  a display size,
  a display start, respectively finish, time,
  a reading speed,
  etc.

Generally, each display parameter can be common to several, in particular to all, the objects of the scenario, or individual to one object of said scenario.

Advantageously, the method according to the invention can comprise a selection of several display parameters, by selecting a button with which said display parameters are associated beforehand.

In fact, it is possible to associate several display parameters with one and the same button. Selecting said button makes it possible to select all these parameters in a single operation, instead of selecting these parameters individually. Thus, configuration of the scenario is simpler, more ergonomic and quicker.

For at least one scenario, a video can be added to said scenario by storing an identifier of said video.

In this case, the video can be stored at a remote site, such as for example the site on which the configuration step is carried out, or a third-party site.

According to a particularly advantageous feature, for at least one scenario, a video can be added to said scenario by storing an internet access address of said video, such as for example a url or ftp address.

In this case, it is possible to modify the augmented reality content by modifying the video accessible at said address, without altering the configuration of the scenario. Thus, the method according to the invention makes it possible to carry out simple and rapid modification of the augmented reality content on the fly.

In addition, this feature makes it possible to use as video, a video stream produced in real time or live. Such a video can for example be the video of an event taking place at the time of generation of the augmented reality content, while the scenario was defined well in advance.

Advantageously, a scenario can be associated with an image by storing, with an identifier of said image:
  an identifier of said scenario; or
  data representing said scenario, such as for example a source code or an executable file of said scenario.

An object can be added to a scenario by storing an identifier or an address of said object with an identifier of said scenario, or in the data representing said scenario.

The method according to the invention can also comprise, during the preliminary phase, allocation of an identifier to a real image by analysis of the content of said real image.

Such an identifier depending on the content of the image makes it possible to identify said image regardless of the support, and regardless of its origin.

Such an identifier can for example be formed by, or generated from, a set or cloud of identified points in said image.

Thus, during the execution phase, the real image read by the user device can be analyzed in order to retrieve its identifier, and to identify the scenario associated therewith.

Analysis of the read image in order to retrieve its identifier can be carried out by the user device or a site remote from said user device.

According to an embodiment that is in no way limitative, the step of identifying the scenario associated with the image read by the user device can comprise the following operations:

transmitting the image read by the user device to a first remote site, identifying said read image at said first remote site by analyzing the content of said image, transmitting an identifier of said read image from said first remote site to said user device, transmitting said identifier by the user device to a second remote site, and identifying the scenario associated with said read image at said second remote site.

The real image can be read on the user device by using an imaging means, such as a camera, with which said user device is equipped.

In particular, the user device can be equipped with a client application configured in order to carry out the method according to the invention and using such an imaging means.

Such a client application can carry out all the steps of the execution phase itself, or call other applications already present in the user device in order to carry out one or more steps of the execution phase.

According to another aspect of the same invention, a system is proposed for generating augmented reality content on the fly on a mobile user device, configured in order to implement all the steps of the method according to the invention.

The system according to the invention can comprise:

a server, at a site remote from said user device, for configuring and associating with at least one real image, a scenario comprising at least one video and at least one display parameter; and a mobile user device configured in order to carry out the following steps:

reading a real image, receiving a scenario associated beforehand with said image, producing augmented reality content by executing said scenario on said read image, and reading said augmented reality content;

the production step comprising deleting, in the entire video, the pixels of a predetermined colour provided as display parameter, in said scenario.

Advantageously, the server can comprise a graphical interface for configuring and associating a scenario with an image.

The graphical interface can be accessible via an internet browser.

The graphical interface can form part of a platform hosted on the server and allowing the configuration of the one or more scenario(s).

BRIEF DESCRIPTION OF THE DRAWINGS

Other advantages and characteristics will become apparent on examination of the detailed description of embodiments that are in no way limitative, and from the attached figures, in which.

DETAILED DESCRIPTION

It is well understood that the embodiments that will be described hereinafter are in no way limitative. Variants of the invention can be envisaged in particular comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together, if there is no objection to this combination from a technical point of view.

In the figures, elements common to several figures retain the same reference sign.

Figure 1:
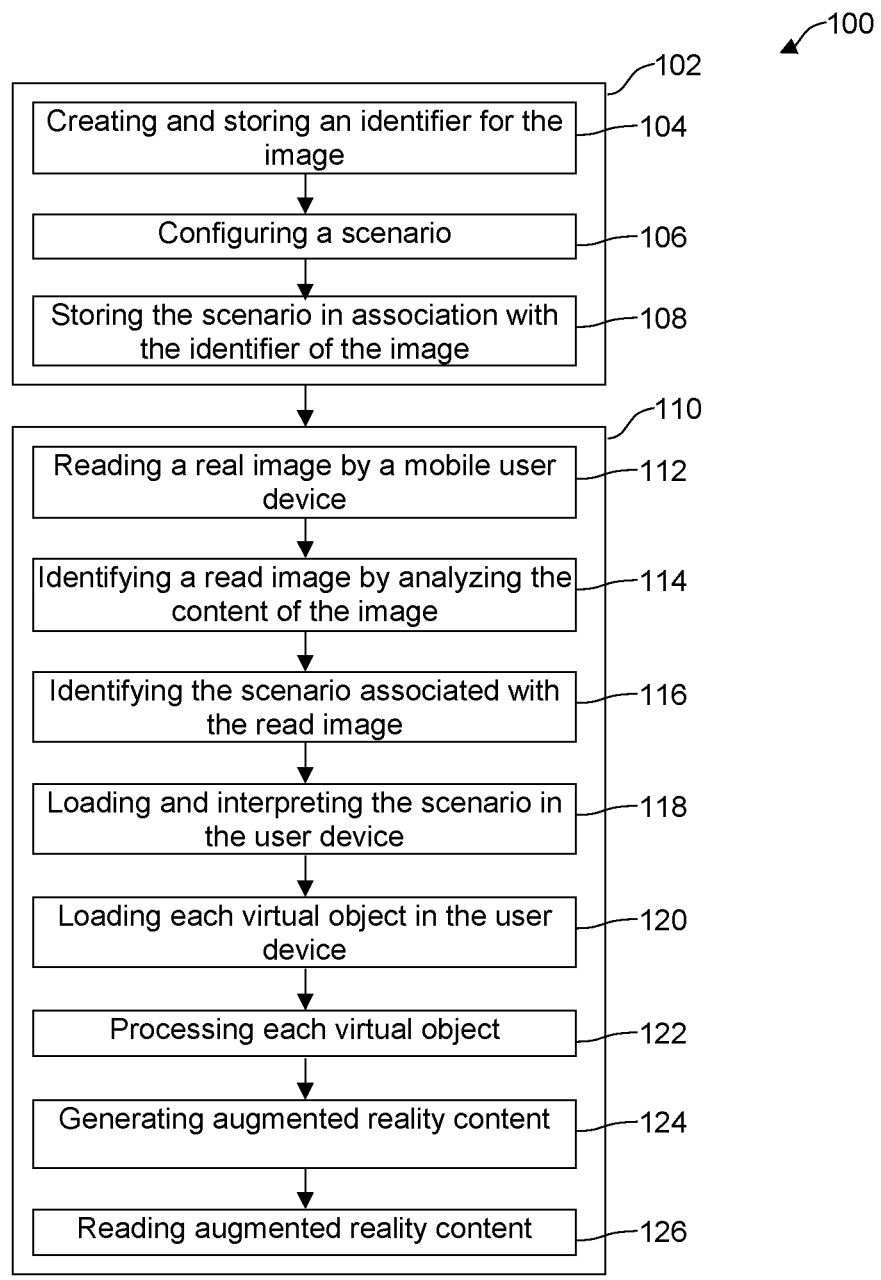
FIG. 1 is a diagrammatic representation of a non-limitative embodiment of a method according to the invention.

FIG. 1 is a diagrammatic representation of a non-limitative example of a method according to the invention.

The method 100, shown in FIG. 1, comprises a phase 102 of configuration of a scenario for at least one real image. The phase 102 is carried out for each image for which it is desired to define a scenario that will be inlaid/superimposed on said image in order to obtain augmented reality content.

The phase 102 comprises a step 104 of creation of an image identifier. To this end, the real image is analyzed, by a predetermined algorithm, in order to detect therein a set of points, or a point cloud, as a function of the content thereof. This point cloud will be used in order to identify this image subsequently.

The point cloud is stored during step 102 with a unique identifier that is attributed thereto.

During a step 106, a scenario is defined for the image.

The scenario comprises one or more virtual objects that will be inlaid into/onto the real image in order to obtain augmented reality content that will be played on the fly on demand by a user.

In all cases, the scenario comprises at least one video.

The scenario can also comprise an image, a sound, etc.

Each object can be added to the scenario by the identifier thereof.

According to a preferred example, a video can be added to a scenario by a url address of said video. Thus, it is possible to use a live video of an event that is produced at the time of generation of the augmented reality content.

The scenario also comprises at least one display parameter, which will be used in order to inlay the virtual object(s), into/onto the real image.

In all cases, at least one display parameter defines a colour to be deleted in a video forming part of the scenario.

The scenario can also comprise at least one display parameter relating to:

a display plane of at least one virtual object relative to the image plane, for example in a plane perpendicular to the image plane;

a display position of at least one virtual object in the image plane;

a start, respectively finish, time of display of at least one virtual object;

etc.

At least one display parameter, for example a reading plane, can be applied to all of the virtual objects of the scenario.

At least one display parameter can be applied individually to an object of the scenario only, such as for example a display position or a colour to be deleted.

The scenario can be defined by using a graphical interface.

Such a graphical interface can comprise a button making it possible to load one or more virtual objects, one or more input zones making it possible to provide an identifier or a url address of a virtual object, etc.

The interface can also list one or more display parameters. For at least one display parameter it is possible for one or more selections to be predefined, in the interface, and offered to the operator.

For at least one video, the interface can comprise a means for selecting a colour to be deleted in a video forming part of a scenario. Such a selection can be carried out directly in the video, or by selecting a colour from several colours offered in the user interface.

During a step 108, the scenario is stored, for example in a database, in association with the identifier of the real image, determined during step 104.

The scenario can comprise an identifier stored with that of the real image. Alternatively, the scenario can have the identifier of the real image as identifier.

The scenario can be represented by a source code, or an executable file.

The method 100 also comprises a phase 110, called execution phase, during which the augmented reality content is produced, and displayed, on a mobile user device.

The execution phase comprises a step 112 of reading an image by the mobile user device. The image can be read from paper media for example. Reading the image can be carried out by using a camera with which the mobile user device is equipped.

During a step 114, the read image is analyzed in order to identify the image. To this end, the read real image is analyzed by the same algorithm as that used during step 104 in order to determine a point cloud. The point cloud is then compared to those stored during step 104 in order to retrieve an image identifier. This analysis step can be carried out on the user device or at a remote site, which can be the one on which the scenario is configured, or a third-party site.

The identifier determined during step 114 is used in a step 116 in order to determine a scenario associated with said image during step 108. This step can comprise transmission of the image identifier to the site on which the scenario is identified, if the latter does not carry out step 114 of identifying the image.

The scenario identified is loaded into the user device in step 118. This loading consists of loading the data representing the scenario, such as for example the source code of the scenario, in particular in the form of an executable file.

The loaded scenario is interpreted by the user device with a view to identifying each virtual object forming part of the scenario, as well as the display parameters applicable to each virtual object.

A step 120 triggers the loading of the virtual objects forming part of the scenario. The loading of the virtual objects can be simultaneous or in turn.

Each virtual object, for which a display parameter is provided in the scenario, is processed in a step 122 in order to apply said display parameter to said virtual object. When no processing is to be applied to a virtual object, the step 122 is not carried out for this virtual object. Such processing can for example be an adjustment of the size of an object, an adjustment of a reading plane of said object with respect to the display plane of the real image, a reading time of said object, etc.

In the event that the virtual object is a video, the processing comprises deletion of a colour in said video. This processing is carried out pixel by pixel, for each image constituting the video. Each pixel of the predetermined colour is replaced by a transparent pixel or is deleted.

The loading 120 and processing 122 steps are carried out individually for each virtual object constituting the scenario. They can be carried out for each virtual object in turn, or for several virtual objects at the same time.

The augmented reality content is generated during a step 124 by playing the scenario over the real image. This generation consists of reading each virtual object in a window comprising the image, and in particular in a window the background of which is constituted by the real image.

During a step 126, the augmented reality content is played over a display screen of the user device. The display window of the augmented reality content can correspond to the entirety, or only a part, of the display screen of the user device.

According to an embodiment, the steps 120-126 are carried out one after another so that the step 122 starts after the end of the step 120 for all the virtual objects, and so on.

According to another embodiment, proposing greater reactivity, a part or the entirety of the steps 120-126 can be superimposed in time. For example, the processing step 122 can start before the end of the loading step 122, in particular when the virtual object is a video. Similarly, the step 124 can start before the end of the processing step 122, and optionally before the end of the loading step 120, and so on for the steps 124 and 126. According to an embodiment, the step 126 of reading the augmented reality content can start before the end of the loading step 120, in particular for a virtual object of the video type.

This embodiment makes it possible to include in a scenario a video captured and broadcast live, i.e. at the same time as the generation of the augmented reality content. To this end, the scenario can comprise a url address broadcasting said video live, which is then downloaded live by streaming to the user device.

Figure 2:
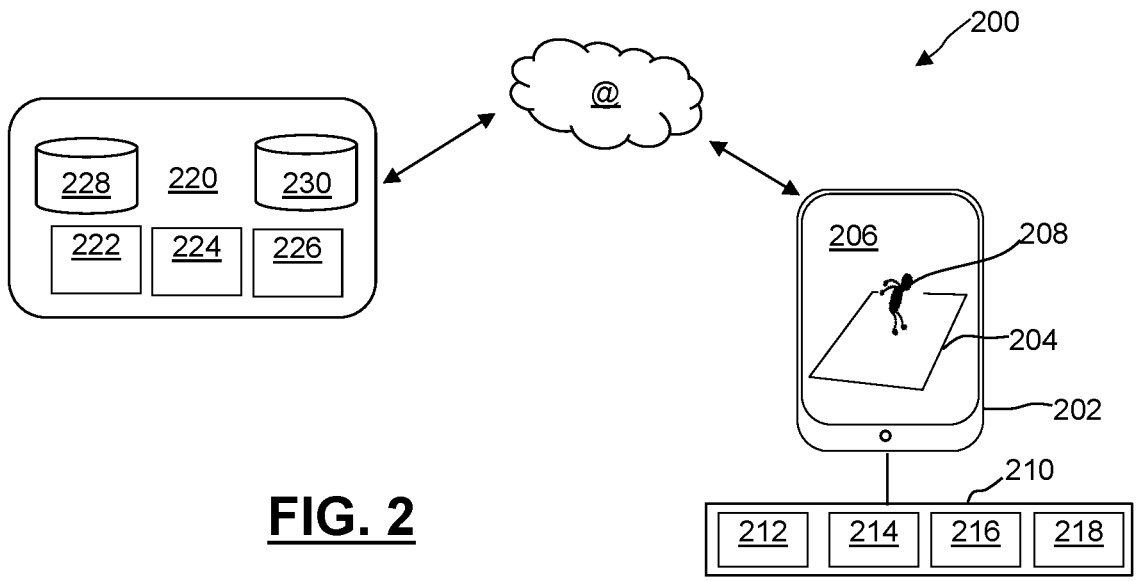
FIG. 2 is a diagrammatic representation of a first non-limitative embodiment of a system according to the invention.

FIG. 2 is a diagrammatic representation of a first non-limitative embodiment of a system according to the invention.

The system 200, represented in FIG. 2, can be used in order to implement the method 100 in FIG. 1.

The system 200 comprises at least one mobile user device 202, for example of the tablet or smartphone type. The user device 202 is provided with a camera (not shown) making it possible to read a real image 204, for example from physical media, and a display screen 206 on which is broadcast the augmented reality content obtained by superimposition of one or more virtual objects 208 with the real image 204.

The user device 202 is also provided with an application 210 making it possible to carry out, or to manage, all of the steps implemented in said user device 202.

In particular, the application 210 comprises a communication module 212 configured in order to communicate with one or more remote servers with a view for example to:

transmitting an image read by the user device 202 to a remote server, optionally, receiving an identifier of an image from a first server and transmitting said identifier to another server, receiving data representing a scenario associated with said image, and loading one or more virtual objects, from one or more remote sites, these objects being identified by means of an identification data item, or by an address data item of the url type.

The application 210 also comprises a module 214 for processing at least one virtual object as a function of at least one display parameter. Such a processing can be an adjustment of the position of the virtual object, an adjustment of a dimension of the virtual object, deletion of a colour in a video, etc.

The application 210 also comprises a module 216 for the production of the augmented reality content. This module 216 carries out a superimposition of the virtual objects on the real image and sends the data to a module 218 for reading the content in a display window defined on the screen 206.

The application 210 is a software application. Similarly, each of the modules 212-218 are software modules using the electronic and digital resources present in the user device, such as memories, a processor, a communication antenna, etc.

In FIG. 2, the modules 212-218 are represented individually and separately, in order to facilitate understanding. Of course, it is possible for these modules to be nested, so as to form one and the same program. In addition, each module can itself be formed by several software or hardware modules.

The system 200 also comprises a central server 220, located on a remote central server remote from the user device 202, and in communication with one said user device 202 via a network of the Internet type.

The server 202 comprises a communication module 222 for exchanging data with the user device 202, a user interface 224 for creating and configuring a scenario, a module 226 for identifying an image by analysis of the content of said image, as well as a first database 228 for storing data representing a scenario in association with an image identifier, and a second database 230 for storing an identifier of an image in association with analysis data of the content of said image, such as a point cloud.

Preferentially, the user interface 224 is accessible via an internet browser in order to define and configure a scenario.

In FIG. 2, the modules 222-226 are represented individually and separately, in order to facilitate understanding. Of course, it is possible for these modules to be nested, so as to form one and the same program.

In the system 200, each new image is analyzed on the server 220 which stores in the database 230 the analysis data of said image with an identifier that is allocated thereto. The identifier is then used for the creation, configuration and storage of a scenario in association with said identifier, in the database 228.

When the user device 202 reads an image, it transmits the read image to the server 220. The latter analyzes the read image and retrieves the identifier of the read image by comparing the data provided by the analysis to those stored in the database 230. The image identifier is used in order to retrieve the scenario associated therewith by consulting the database 228. The data representing the scenario associated with the read image are sent to the user device 202.

The virtual objects constituting the scenario can be loaded from the server 220, or any other server or third-party internet site.

Figure 3:
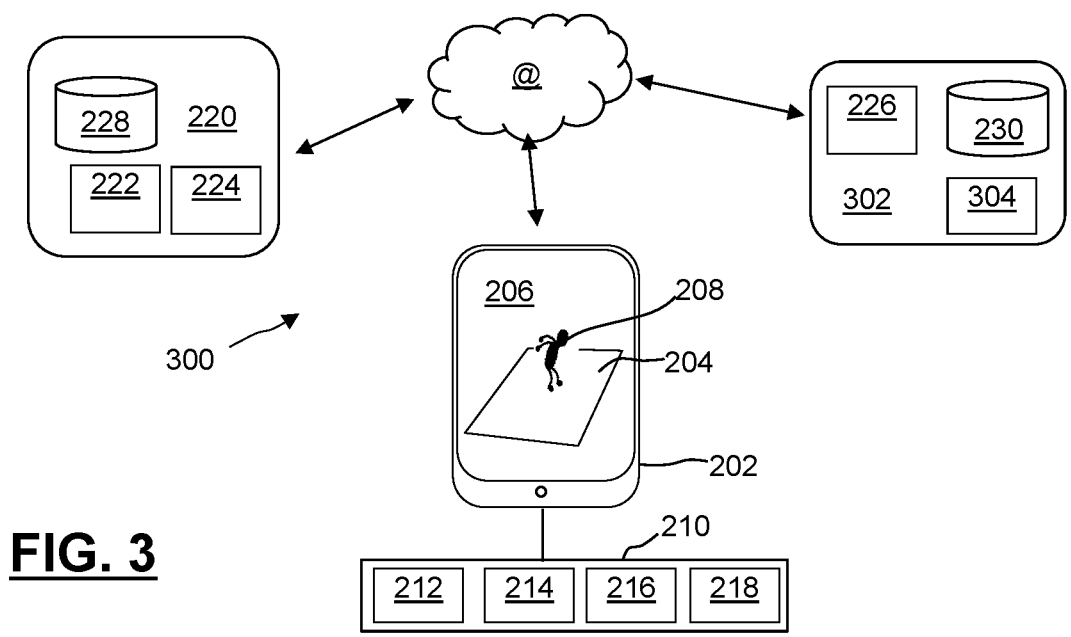
FIG. 3 is a diagrammatic representation of a second non-limitative embodiment of a system according to the invention.

FIG. 3 is a diagrammatic representation of a second non-limitative embodiment of a system according to the invention.

The system 300, represented in FIG. 3, can be used in order to implement the method 100 in FIG. 1.

The system 300 comprises all the elements of the system 200 in FIG. 2. Unlike the system 200, in the system 300 the image analysis module 226 and the database 230 are sited in a server 302 located on a site remote both from the user device 202 and from the site on which the server 220 is located.

The server 302 comprises a module 304 for communication with the server 220 and the user device 202.

In the system 300, each new image is analyzed on the server 302, which stores the analysis data of said image, in the database 230, with an identifier allocated thereto. The identifier is then communicated to the server 220 for the creation, configuration and storage, in the database 228, of a scenario in association with said identifier.

When the user device 202 reads an image, it transmits the read image to the server 302. The latter analyzes the read image and retrieves the identifier of the read image by comparing the data provided by the analysis to those stored beforehand in the database 230. The identifier of the read image is sent to the user device 202. The latter sends this identifier to the server 220, which identifies the scenario associated therewith, by consulting the database 228, and sends the data representing the scenario to the user device 202.

The virtual objects constituting the scenario can be loaded from the server 220, or the server 302, or any other server or third-party internet site.

Only one user device 202 is shown in each of FIGS. 2 and 3. Of course, the system according to the invention is not limited to a single user device and can comprise many user devices.

In addition, each of the servers 220 and 302 can be constituted by a single server, or by a group of servers, or computers, located on one and the same site or on different sites.

In addition, each database 228 and 230 can be stored on one and the same site or on different sites, or also in the cloud.

Of course, the invention is not limited to the examples that have just been described, and numerous modifications may be made to these examples without exceeding the scope of the invention.

The invention claimed is:

1. A method for generating on the fly augmented reality content on a mobile user device, said method comprising the following steps:
   during a phase, called preliminary phase, carried out for at least one image, called real image:
      configuring a scenario comprising at least one video and at least one display parameter, and
      associating said scenario with said real image;
   during a phase, called execution phase:
      reading of a real image by said user device,
      identifying a scenario associated beforehand with said real image,
      producing augmented reality content on said user device, by executing said scenario on said real image, and
      reading of said content by said mobile user device;
the production step comprising deleting, in the entire video, the pixels of a predetermined colour provided as display parameter, in said scenario; and
the step of identifying the scenario associated with the image read by the user device comprises the following operations:
   transmitting the image read by the user device to a first remote site;

identifying said read image at said first remote site by analyzing the content of said image;

transmitting an identifier of said read image from said first remote site to said user device;

transmitting said identifier by the user device to a second remote site; and identifying the scenario associated with said read image at said second remote site.

2. The method according to claim 1, characterized in that the production step is carried out progressively with the step of reading the content.

3. The method according to claim 1, characterized in that it comprises loading the video into the user device as the production step progresses, and even more particularly simultaneously.

4. The method according to claim 1, characterized in that deleting a colour in the video comprises replacing each pixel of said colour by a transparent pixel.

5. The method according to claim 1, characterized in that the configuration step comprises, for at least one video forming part of a scenario, a manual step of selecting the colour to be deleted.

6. The method according to claim 1, characterized in that a scenario also comprises a visual object other than the video.

7. The method according to claim 1, characterized in that a scenario comprises at least one display parameter relating to the orientation of a display plane of at least one object of the scenario with respect to the display plane of the read image, provided to the user device during the execution phase, and used during the production step for adjusting the orientation of said at least one object.

8. The method according to claim 1, characterized in that it comprises a selection of several display parameters, by selecting a button with which said parameters are associated beforehand.

9. The method according to claim 1, characterized in that, for at least one scenario, a video is added to said scenario by storing an identifier of said video.

10. The method according to claim 1, characterized in that, for at least one scenario, a video is added to said scenario by storing a url or ftp address of said video.

11. The method according to claim 1, characterized in that the preliminary phase comprises allocation of an identifier to the real image by analysis of the content of said real image.

12. A system for generating on the fly augmented reality content on a mobile user device, configured in order to implement all the steps of the method according to claim 1, said system comprising:

a server, at a site remote from said user device, for configuring and associating with at least one real image, a scenario comprising at least one video and at least one display parameter; and a mobile user device configured in order to carry out the following steps:

reading a real image;

receiving a scenario associated beforehand with said read image;

producing augmented reality content by executing said scenario on said read image; and reading said augmented reality content;

the production step comprising deleting, in the entire video, the pixels of a predetermined colour provided as display parameter, in said scenario.

13. The system according to claim 12, characterized in that the server comprises a graphical interface for configuring and associating a scenario with an image.

* * * * *